Patented Sept. 6, 1938

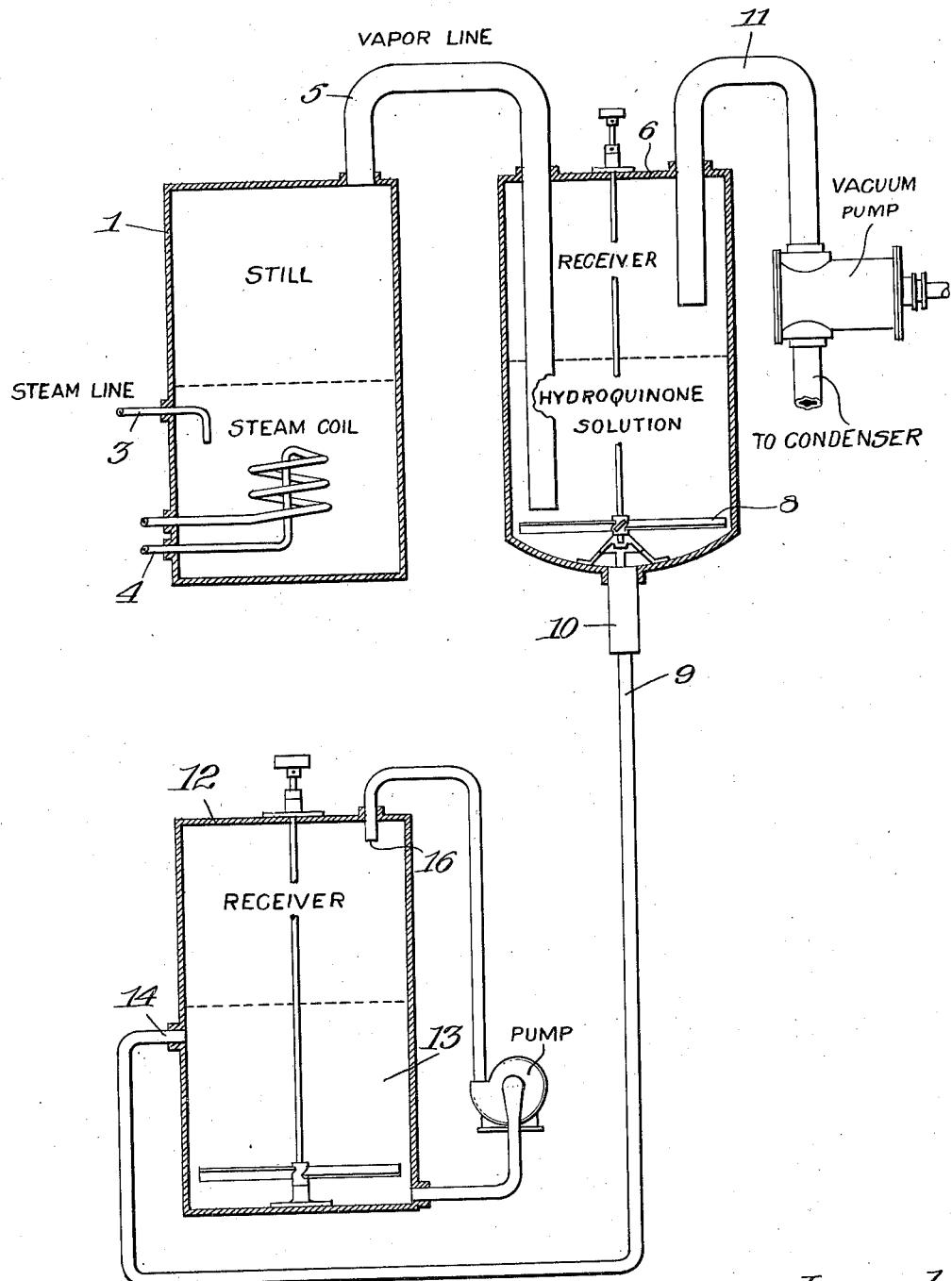

2,129,429

UNITED STATES PATENT OFFICE 2,129,429

METHOD FOR THE PREPARATION OF HYDROQUINONE FROM QUINONE

Karl Kleimenhagen, La Salle, Ill., assignor to Carus Chemical Company, a corporation of Illinois Application July 15, 1937, Serial No. 153,845

5 Claims. (Cl. 260—621)

This invention relates to the preparation of hydroquinone and more particularly to the preparation of hydroquinone by the distillation of quinone into a hydroquinone solution to manufacture quinhydrone and subsequent reduction of the quinhydrone to hydroquinone.

The manufacture of hydroquinone in this manner has certain advantages. It has now been discovered, however, that particularly in those instances where only hydroquinone is employed in the condensing bath, it is highly advantageous to employ an extremely low temperature therein in order to avoid crystallization difficulties with the subsequently produced hydroquinone.

The necessity for the use of extremely low temperatures at this point is particularly remarkable because after removal from the condensing bath the quinhydrone slurry is then heated to higher temperatures. In order to procure the best results it is preferable that the temperature in the condenser be at least as low as 35° C. and preferably of the order of 25° C.

The invention is illustrated diagrammatically in the drawing, wherein I represents a still containing a slurry of quinone oxidation mixture 2 into which steam may be introduced from the line 3 and which may be heated by the steam coil 4. Vapors from the still are removed through the vapor line 5 terminating a considerable distance below the liquid level of the solution 7 in the receiver 6. The receiver is provided with an agitator 8 and a draw-off 9 provided with a valve 10. The receiver communicates by the line 11 to a vacuum pump and barometric condenser, not shown. Line 9, through which the quinhydrone crystals are removed, may lead to a reducer 12 containing a reducing slurry 13 below the level of which the line 9 enters at 14. A pump 15 recirculates liquid from the reducer and sprays it onto the surface at 16.

As an example of the process, quinone is prepared by the oxidation of aniline sulfate with manganese dioxide, for example by the gradual addition of a solution of:

| | Parts |
|---|---|
| Water | 3800 |
| 60° Bé. sulfuric acid | 2800 |
| Aniline | 800 | to a slurry consisting of

| | Parts |
|---|---|
| Manganese dioxide (85% $MnO_2$) | 2200 |
| Vanadium pentoxide (or its equivalent of a vanadium salt) | 1.5 |
| Iron filings | 25 |
| 60° Bé. sulfuric acid | 1300 |
| Water | 1800 | which has been previously mixed and cooled to about 5° C. The solution is added at such a rate that the temperature of the reaction mixture does not rise above 8° C.

After the addition is completed the mixture is heated to about 38° C. and maintained at about that temperature in order to keep the aniline sulfate in solution. With proper cooling facilities the total time of addition of the aniline sulfate solution is usually about 7 hours and 7 more hours are allowed to complete the oxidation, during which time the temperature is allowed to rise 10° to 12°. Thereafter the mixture is discharged into a large wooden vat wherein it is partly neutralized. The oxidation itself is run with considerable excess acid, whereas it is preferred for distillation purposes to have a free acid content not greater than 2.5%. Free acid may be overcome by the addition of calcium carbonate, normally about 400 parts of limestone being used. After the partial neutralization the batch is charged into a still in any suitable manner.

It may be desirable to use a still containing an entire batch or to feed the batch gradually into the still as distillation proceeds. In the present process it is preferred to carry on distillation under a reduced pressure to produce a boiling temperature of about 65° C., the batch being heated to this temperature very gradually to cut down losses of quinone in the carbon dioxide evolved. The addition of the material gradually to the still makes the handling of the carbon dioxide problem much more simple.

During distillation live steam is introduced into the still as required to prevent caking, and heating is continued, likewise with a steam coil, or other suitable heating means. It is preferred, however, to concentrate the oxidation mixture in order to lower the solubility of the quinone therein.

The vapors from the still are condensed in a receiver which communicates with the still by a vapor pipe terminating considerably below the liquid level in the receiver, thereby establishing a pressure difference between receiver and still. An absolute pressure of from 1 to 1.2" of mercury is maintained in the receiver, corresponding to a temperature of 25–30° C.

The condensing bath is preferably a neutral or slightly acid solution of hydroquinone and water. Free acid should not exceed 10 grams per liter. It is preferred to maintain at least a 50% excess of hydroquinone at all times in the receiver above that required to convert all quinone vapor into quinhydrone. The presence of such an excess apparently greatly depresses the vapor pressure of the quinone, presumably by mass action, preventing dissociation of quinhydrone into quinone and hydroquinone. This cuts down the losses of quinone in the vapors from the boiling solution in the receiver.

The vapors entering the receiver are condensed, due to the difference in temperature, and the quinone immediately reacts with the hydroquinone to form quinhydrone by simple addition. Approximately the same amount of water evaporates from the boiling solution in the receiver as is condensed therein.

All of the hydroquinone may be introduced into the receiver at one time or additional amounts may be added from time to time. When it is decided to remove quinhydrone from the receiver the agitator 8 is operated to force the quinhydrone crystals into suspension, after which they are discharged through the opening 9.

The agitator may also be employed during the distillation if desired, but is normally unnecessary. It may be employed to some advantage in scrubbing non-condensible gases passing from the still at the beginning of the distillation.

The quinhydrone crystals are removed to a separate vessel containing a slurry of iron filings (200 parts) and hydroquinone mother liquor. The free acid in the mother liquor reacts with metallic iron to form ferrous salts. The slurry is then heated to 45°–50° C. and quinhydrone added gradually at a point below the surface of the liquid. The liquid is agitated thoroughly and as the reaction proceeds it is preferred to positively circulate some of the liquid, spraying in the recirculated liquid at the top of the container to reduce the foam formed on the surface.

When all of the quinhydrone has been reduced the material is heated at about 80° C. and filtered to remove iron oxides and any remaining metallic iron. The batch may be concentrated by boiling before the filtration, if desired.

After filtering it is acidified with sulfuric acid, bleached and again filtered to remove the bleaching materials which are preferably zinc dust and charcoal, and is then run into a crystallizer where it is cooled to room temperature or lower. The product is centrifuged to produce the higher grades and the material is then re-crystallized from water.

What I claim as new and desire to secure by Letters Patent is:

1. The method of forming crystalline hydroquinone which comprises distilling quinone in a vacuum, condensing quinone from the vapors in a hydroquinone solution at a temperature below 35° C. to form quinhydrone, and reducing so formed quinhydrone to hydroquinone and crystallizing hydroquinone so produced.

2. The method as set forth in claim 1, in which the quinhydrone is heated to a temperature above 35° C. in the reducing operation.

3. The method as set forth in claim 1, in which the reducing medium in the condensing medium is substantially hydroquinone.

4. The method of forming hydroquinone which comprises steam-distilling quinone from a reaction mass containing the same at a temperature of the order of 65° C., and forming quinhydrone by condensing quinone from the resulting vapors in a hydroquinone solution in water maintained under a pressure of the order of 1″ to 1.2″ of mercury absolute, reducing so-formed quinhydrone to hydroquinone and crystallizing the hydroquinone.

5. The method as set forth in claim 1, in which hydroquinone is maintained in considerable excess in the condensing medium with respect to the amount required to convert all of the quinone to quinhydrone.

KARL KLEIMENHAGEN.